United States Patent [19]

Yonezawa

[11] Patent Number: 4,909,493

[45] Date of Patent: Mar. 20, 1990

[54] CYLINDER TYPE HYDRAULIC CLAMP

[75] Inventor: Keitaro Yonezawa, Amagasakishi, Japan

[73] Assignee: Kabushiki Kaisha KOSMEK, Hyogoken, Japan

[21] Appl. No.: 281,775

[22] Filed: Dec. 8, 1988

[30] Foreign Application Priority Data

Dec. 25, 1987 [JP] Japan ................................ 62-331016

[51] Int. Cl.[4] ................................................ B23Q 3/06

[52] U.S. Cl. ...................................... 269/32; 269/48.1; 269/309

[58] Field of Search ........................ 269/20, 24, 27, 32, 269/25, 48.1, 93–94, 50, 52, 91, 157, 309, 310

[56] References Cited

U.S. PATENT DOCUMENTS 4,174,828 11/1979 Bergman ................................ 269/20
4,577,847 3/1986 Schedwin .
4,620,695 11/1986 Vanistendoel ........................ 269/24
4,688,974 8/1987 Wright et al. .

FOREIGN PATENT DOCUMENTS 5623223 3/1981 Japan .

*Primary Examiner*—Robert C. Watson
*Attorney, Agent, or Firm*—Lowe, Price, LeBlanc, Becker & Shur

[57] ABSTRACT

A cylinder type hydraulic clamp having a clamping mechanism is adapted to be actuated by means of a hydraulic cylinder, and has a piston rod projected through the cylinder body of the hydraulic cylinder and is equipped at its leading end portion with the clamping means. The clamping means is arranged concentrically with the piston rod and is adapted to be resiliently urged by means of a contraction spring toward its contracted position to be pushed by means of an expansion slant cam toward its expanded position. At the time of the clamping actuation, when the clamping means is hydraulically actuated toward the cylinder body through the piston and the piston rod, the clamping means is first expanded diametrically by means of the expansion slant cam against the resilient force of the contraction spring and then a member to be clamped is fixedly pressed between the cylinder body and the clamping means expanded as mentioned above.

8 Claims, 9 Drawing Sheets

CYLINDER TYPE HYDRAULIC CLAMP

BACKGROUND OF THE INVENTION

1. Field of the Invention

The present invention relates to a cylinder type hydraulic clamp which is adapted to drive a clamping means by means of a hydraulic cylinder and, more particularly, to a hydraulic clamp of such a type that a leading end portion of a piston rod projected from a cylinder body is provided with a clamping means and a member to be clamped is adapted to be fixedly pressed between the cylinder body and the clamping means by hydraulically driving the clamping means toward the cylinder body under such a condition that the clamping means is advanced in a radial direction from the periphery of the piston rod.

2. Background of the Prior Art

A cylinder type hydraulic clamp, conventionally known the one shown in Japanese Provisional Utility Model Publication No. 1981-23,223 which is previously proposed by the inventor of the present invention.

As shown in FIGS. 15 and 16 (for a first conventional embodiment) and in FIG. 17 (for a second conventional embodiment hereof), the basic known constructions are as follows.

In a hydraulic cylinder 151 fixedly secured to a fixed member A is disposed in an upwardly facing manner so that a piston rod 152 projects upwardly, the upper portion 155 of the piston rod 152 which projects upwardly through the upper end wall 154 of the cylinder body 153 is equipped with a clamping means 156. The clamping means 156 is adapted to be pushed down through the piston 158 and the piston rod 152 by an oil pressure force of a pressure oil to be supplied to a clamp actuation oil chamber 157 within the cylinder body 153 so that a member B to be clamped which is externally fitted to the piston rod 152 can be fixedly pressed from its upper side by the clamping means 16 between the cylinder body 153 and the clamping means 156.

In this basic construction, when the member B to be clamped is externally fitted for its setting to the piston rod 152 from its upper side, it is necessary to prevent the clamping means 156 from projecting radially from the periphery of the piston rod 152 so as not to obstruct the setting. On the other hand, when clamping the member B to be clamped which has been settled onto the piston rod 152, it is necessary to project the clamping means 156 in the radial direction from the periphery of the piston rod 152.

The constructions of the portions for projecting or retracting the clamping means 156 in the radial direction, with respect to the periphery of the piston rod 152 in this way are as follows in the respective conventional embodiments.

First Conventional Embodiment (refer to FIGS. 15 and 16)

In this embodiment, the periphery of the upper portion 155 of the piston rod 152 is provided with a rod neck 160 so that the clamping means 156 formed in a C-like configuration in a plan view can be detachably engaged with the rod neck 160 in its lateral direction.

Second Conventional Embodiment (refer to FIG. 17)

In this embodiment, the clamping means 156 comprises a bolt 161, of which leg portion is detachably and threadably engaged with a threaded hole 162 formed in the upper portion 155 of the piston rod 152.

However, the following defects are associated with the first conventional embodiment (refer to FIGS. 15 and 16).

(a) It takes much labor for performing a clamping operation.

Every time the member B to be clamped is exchanged and the clamping is formed therefor, it is required to manually perform the attaching and detaching of the clamping means 156 with respect to the rod neck 160. Therefore, it takes much labor for performing the clamping operation.

(b) In the case that the attaching and detaching of the clamping means 156 is automated, the general construction of the clamp device becomes large and complicated.

In the case of the automation of the attaching and detaching of the clamping means 156 in the hydraulic clamp, an actuation device is required for attaching and detaching the clamping means 156 with respect to the rod neck 160. Since the clamping means 156 is located at the side opposed to the cylinder body 153 through the member B to be clamped therebetween, the actuation device for attaching and detaching the clamping means 156 must be provided separately from the cylinder body 153. Therefore, the entire clamp device becomes large and complicated.

Furthermore, in order to prevent mistakes in the attaching and detaching operation of the actuation device and for the clamping and unclamping operation of the hydraulic cylinder 151, it is necessary to additionally provide an operation procedure control device for the hydraulic clamp. Therefore, the general construction of the clamp device becomes more complicated.

(c) The clamping capability of the hydraulic clamp is small.

When the member B to be clamped is fixedly pressed by a hydraulic pressure of the hydraulic cylinder 151 through the clamping means 156, the C-shaped clamping means 156 has an opening portion for fitting to the rod neck 160 of the piston rod 152 and the opening portion doesn't function as an effective pressing area. Therefore, the effective pressing area gets decreased thereby and the pressing capability also decreases correspondingly. Consequently, the clamping capability of the hydraulic clamp is limited within a small value.

(d) The durability of the piston rod 152 is low.

First of all, since the clamping means 156 has the effective pressing area decreased by the ineffective pressing area of the opening portion thereof, it is subjected to a high force per unit area. Therefore, the clamping means 156, especially at its opposite ends adjacent to the opening portion thereof and the rod upper portion 155 are subjected to an excessively high pressure and tend to deform as well as shear. Also, the rod neck 160 of the rod upper portion 155 is subjected to a large bending stress because it is bent toward the ineffective pressing area of the clamping means 156 due to the existence of the ineffective pressing area incapable of bearing a pressing force.

As noted above, the durability of the piston rod 152 is low owing to the high pressure per unit area as well as the large bending stress at the rod upper portion 155.

On the other hand, in the second conventional embodiment (refer to FIG. 17), the problems (c) and (d) of the respective problems (a) through (d) in the former first embodiment are solved advantageously, but the problems (a) and (b) thereof still remain unsolved.

That is, every time the member B to be clamped is exchanged and clamped, it takes much labor to perform the clamping operation because the leg portion of the bolt 161 has to be manually detachably engaged with the upper portion 155 of the piston rod 152.

When the attaching and detaching operation of the bolt 161 as the clamping means 156 is automated, an actuation device is required for performing the attaching and detaching operation of the clamping means 156 and the actuation device has to be provided separately from the hydraulic cylinder 151, as mentioned above. Therefore, the whole of the clamp device becomes large and complicated. Furthermore, in order to prevent mistakes in attaching and detaching the actuation device and for the clamping and unclamping operation of the hydraulic cylinder 151, it is necessary to additionally provide an operational procedure control device for the hydraulic clamp. Therefore, the entire hydraulic clamp becomes larger and more complicated.

SUMMARY OF THE INVENTION

The present invention is directed to solving the above-mentioned respective problems (a) through (d) and has as its objects to facilitate clamping operation of the hydraulic clamp, to make the hydraulic clamp small in size and simple in construction, to enhance the clamping capability of the hydraulic clamp, and to improve the durability of the piston rod of the hydraulic clamp.

For accomplishing the above-mentioned objects, the present invention is intended to modify as follows the construction of the portion for advancing and retracting the clamping means in a radial direction from the periphery of the piston rod in the above-mentioned basic construction.

The clamping means is constructed so as to be able to be changed over between a clampable advanced position radially remote from the periphery of the piston rod and an unclampable retracted position radially close to the periphery of the piston rod. The clamping means is constructed so as to be resiliently urged to the unclampable retracted position by means of a construction spring and to be pushed to the clampable advanced position by means of an expansion slant cam.

At the time of the clamping operation, the clamping means is adapted to by hydraulically actuated toward the cylinder body by a hydraulic pressure force in the hydraulic cylinder through the piston and the piston rod. Thereupon, the clamping means is radially expanded by an initial stage of the hydraulic actuation force through the expansion slant cam against the contraction spring so as to be automatically changed over from the unclampable retracted position to the clampable advanced position. Then the clamping means is pushed toward a clamping position by a latter stage of hydraulic actuation force through the rod output portion arranged in the piston rod.

Meanwhile, at the time of the unclamping operation, the piston of the hydraulic cylinder is adapted to be returned contrary to above-mentioned clamping operation. Thereupon, firstly the clamping means is returned to an unclamping position during its initial stage of the returning actuation process and then changed over from the clampable advanced position to the unclampable retracted position by means of the contracting spring during the latter stage.

When the present invention is constructed and functions as mentioned above, the following advantages are obtained.

(a) The clamping and unclamping operations can be carried out easily.

Since the clamping means is changed over interlockingly with the piston of the hydraulic cylinder, it becomes unnecessary to manually operate the clamping means and, accordingly, the clamping and unclamping operations can be carried out easily.

(b) The hydraulic clamp can be made small and simplified.

When automating such an operation as to project and retract the clamping means relative to the periphery of the piston rod, the actuation device for attaching and detaching the clamping means is not required differently from the conventional constructions because the positional change-over of the clamping means is carried out interlockingly with the hydraulic cylinder. Furthermore, since the operational procedure for the positional change-over operation of the clamping means and the clamping or unclamping operation of the hydraulic cylinder is distinguished by the stroke itself of the piston, the operational procedure control device also is not required.

In this way, since both the actuation device for attaching and detaching the clamping means and the operational procedure control device can be omitted, the construction of the hydraulic clamp can be simplified and made small.

(c) The clamping capability of the hydraulic clamp can be enhanced.

When the clamping means is changed over from the unclampable retracted position to the clampable advanced position, it is pushed so as to be expanded substantially uniformly to the position remote from the periphery of the piston rod as well as the underside of the clamping means is arranged along the whole periphery of the rod output portion so that its openings incapable of pressing can be reduced and a sufficiently large pressing area can be obtained surely. Accordingly, the pressing force of the clamping means can be increased and the clamping capability of the hydraulic clamp can be enhanced.

(d) The durability of the piston rod can be improved.

Since the pressing area of the clamping means is large enough as mentioned above, the force per unit area at the contacting surface of the clamping means with the rod output portion is decreased. Furthermore, since the clamping means is arranged substantially uniformly along the whole periphery of the rod output portion, small stress concentration and bending stress are generated in the piston rod. Therefore, the durability of the piston rod can be improved remarkably.

BRIEF DESCRIPTION OF THE DRAWINGS

The present invention will be described in greater detail in connection with the following drawings, wherein:

FIG. 1 through 5 show a first embodiment thereof;

FIG. 1 is a vertical sectional view showing a use condition of a hydraulic clamp;

FIGS. 2(*a*) through 2(*c*) are operational explanatory views of the hydraulic clamp;

FIG. 2(*a*) is a view showing an unclamping condition thereof;

FIG. 2(*b*) is a view showing a transitive condition of the change-over thereof;

FIG. 2(*c*) is a view showing a clamping condition thereof;

FIG. 3 is a sectional view on III—III directed line in FIG. 2(*a*);

FIG. 4 is a sectional view on IV—IV directed line in FIG. 2(*b*);

FIG. 5 is an exploded perspective view showing a clamping means and a contraction spring;

FIGS. 6 through 9 show other embodiments of the present invention;

FIGS. 6(*a*) through 6(*d*) show a second embodiment thereof and are operational explanatory views of the hydraulic clamp;

FIG. 6(*a*) is a view showing an unclamping condition thereof;

FIG. 6(*b*) is a view showing a retracted condition of a clamping means;

FIG. 6(*c*) is a view showing a projected condition of the clamping means;

FIG. 6(*d*) is a view showing a clamping condition thereof;

FIG. 7 shows the second embodiment and is a view corresponding to FIG. 6(*a*);

FIG. 8 shows a third embodiment of the present invention and is a view corresponding to FIG. 2(*c*);

FIG. 9 shows a fourth embodiment thereof and is a view corresponding to FIG. 2(*c*);

FIGS. 10 through 14 show a variant examples of the hydraulic clamp respectively;

FIG. 10 shows a first variant example and is a view corresponding to FIG. 1;

FIG. 11 shows a second variant example and is a partial view corresponding to FIG. 1;

FIG. 12 shows a third variant example and is a partial view corresponding to FIG. 11;

FIG. 13 shows a fourth variant example and is a front view of the clamping means;

FIG. 14 shows a fifth variant example and is a view corresponding to FIG. 12;

FIGS. 15 and 16 show a first conventional embodiment;

FIG. 15 is a vertical sectional view showing a use condition of a hydraulic clamp;

FIG. 16 is a plan view thereof; and

FIG. 17 shows a second conventional embodiment and is a view corresponding to FIG. 15.

DESCRIPTION OF THE PREFERRED EMBODIMENTS

Preferred embodiments of the present invention will now be explained with reference to the drawings.

First Embodiment

FIGS. 1 through 5 show the first embodiment.

Figure 1:
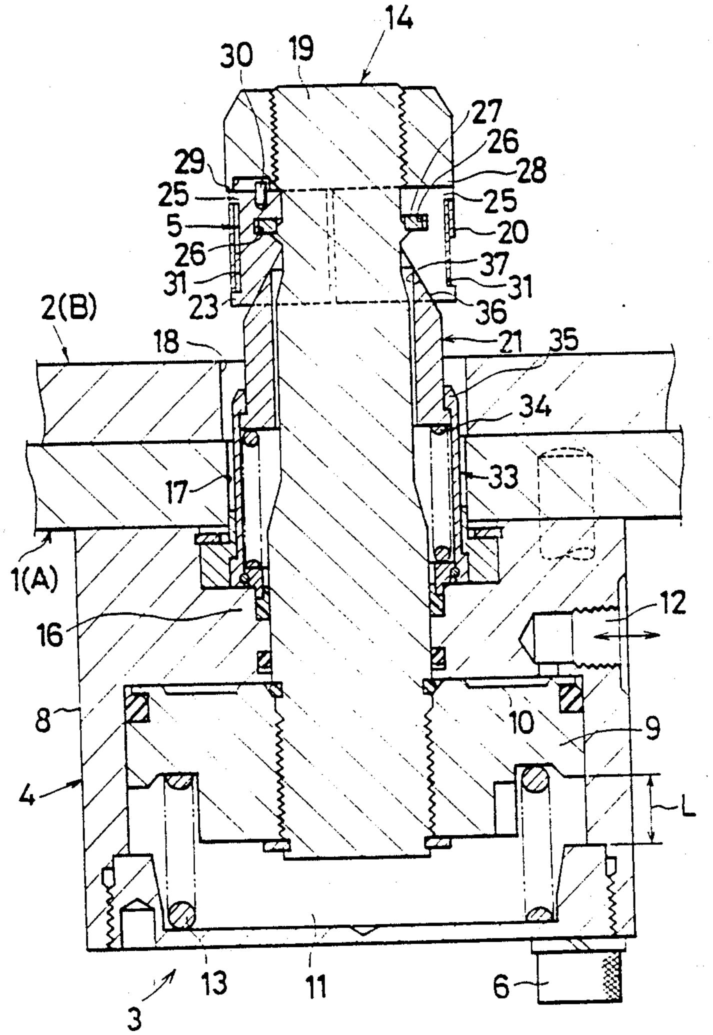
FIGS. 1 through 14 show embodiments of the present invention.

In FIG. 1, a workpiece 2 such as a member B to be clamped, is adapted to be fixedly secured onto an upper surface of a fixed table 1 serving as a fixed member A through a hydraulic clamp 3. The hydraulic clamp 3 is provided with a hydraulic cylinder 4 and a clamping means 5. The hydraulic cylinder 4 is fixedly secured on the underside of the fixed table 1 by means of a plurality of bolts 6, and the clamping means 5 is interlockingly connected to the upper portion of the hydraulic cylinder 4. The clamping means 5 is adapted to be pushed down by a hydraulic pressure in the hydraulic cylinder 4 so that the workpiece 2 can be fixedly pressed to the upper surface of the fixed table 1.

The hydraulic cylinder 4 is preferably having a piston constructed as a type returned by a single acting spring. That is, a piston 9 is accommodated vertically slidably within the lower portion of the hydraulic cylinder body 8 in an oil-tight manner. A clamping actuation oil chamber 10 is provided above the piston 9 and a spring chamber 11 is provided below the piston 9. The clamping actuation oil chamber 10 is communicated with an unillustrated hydraulic pressure source through an oil supply/discharge port 12. On the other hand, in the spring chamber 11 there is provided a piston returning spring 13 composed of a compression oil spring. A piston rod 14 is projected upwardly from the upper surface of the piston 9 so as to pass through the upper end wall 16 of the cylinder body 8 slidably in an oil-tight manner. Furthermore, the piston rod 14 is adapted to be passed vertically slidably through the through-hole 17 of the fixed table 1 as well as the through-hole 18 of the work 2.

Figure 2:
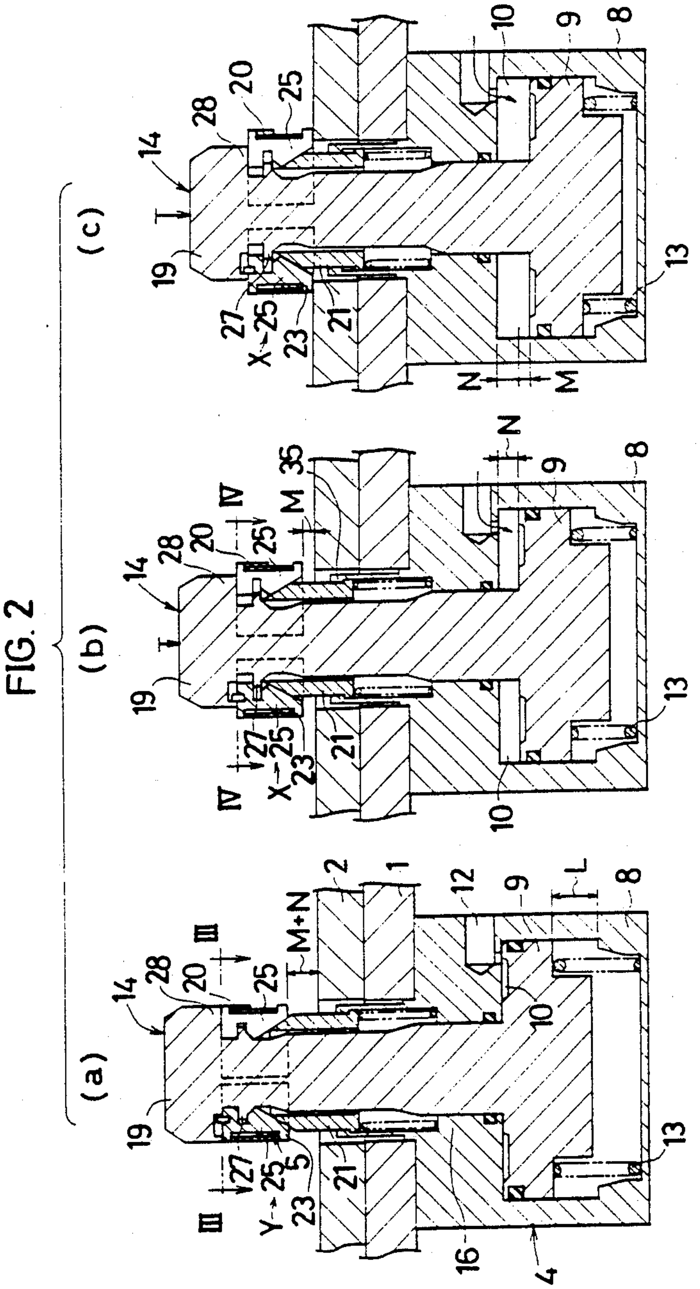

The piston rod 14 is provided at its upper portion 19 with the clamping means 5, a contraction spring 20 and an expansion slant cam 21. As shown in FIG. 2, at least the lower portion 23 of the clamping means 5 is adapted to be urged resiliently by the contraction spring 20 toward the unclampable retracted position Y radially close to the periphery of the piston rod 14 and on the contrary to be pushed toward the clampable advanced position X radially remote from the periphery of the piston rod 14. The allowable stroke L of the piston 9 within the cylinder body 8 in the vertical direction is settled in not less than a dimension obtained by adding a clamping means expansion lift N to a clamp actuation lift M.

Figure 3:
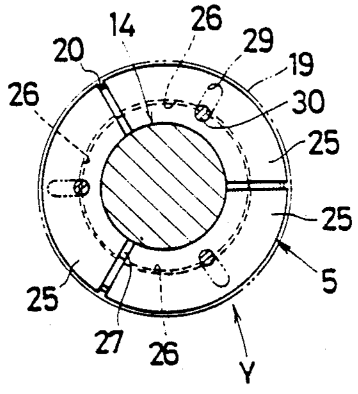
Figure 4:
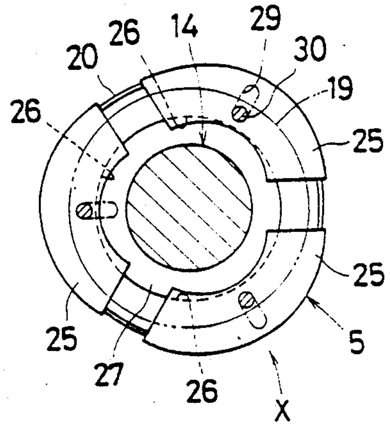
Figure 5:
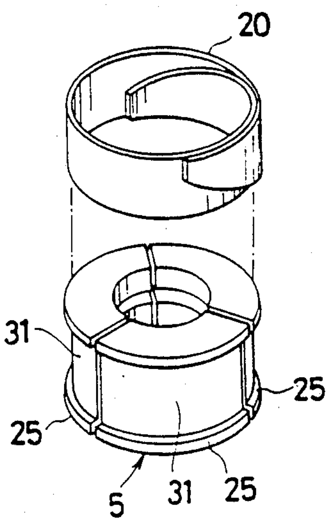

The clamping means 5 and the contraction spring 20 will first be explained with reference to FIG. 1 and FIGS. 3 through 5. FIG. 3 is a vertical sectional view on III—III directed line in FIG. 2(*a*), FIG. 4 is a vertical sectional view on IV—IV directed line in FIG. 2(*b*), and FIG. 5 is an exploded perspective view showing the clamping means 5 and the contraction spring 20.

The clamping means 5 comprises three clamping members elements 25, 25, 25 arranged in an annular shape, and the respective clamping members 25 are adapted to be shifted radially, expansively and contractively with respect to the piston rod 14. The respective clamping members 25 are thus arranged in an annular shape and are provided at the middle height of their inner peripheries with expanding and contracting shift guide peripheral grooves 26. An expanding and contracting shift guide ring 27 is fixedly fitted to the upper portion 19 of the piston rod 14 and slidably engaged with the expanding and contracting shift guide peripheral grooves 26. Further, there is provided a guide means for guiding the respective clamping members 25 linearly in the radial direction of the piston rod 14. That is, a rod output portion 28 is formed by diametrally enlarging the rod output portion 19, and three radial guide channels 29, 29, 29 are formed on the underside of the rod output portion 28. Guide pins 30 are projected from the upper surfaces of the respective clamping members 25 so as to be slidably guided and engaged with the guide channels 29. Accordingly, the clamping members 25 are guided slidably only in the radial direction relative to the piston rod 14.

Spring receiving grooves 31 are formed on the outer peripheral surfaces of the respective clamping members 25, and the contraction spring 20 is mounted around the spring receiving grooves 31. As shown in FIG. 5, the contraction spring 20 is composed of a spiral plate spring. The spring width at one of the longitudinal opposite end portions of the plate spring is narrowed downwardly and on the contrary the spring width at the other end portion thereof is narrowed upwardly. Therefore, in the spring expanded condition in which the clamping means 5 is changed over to the clampable advanced position X, since the total spring width of the overlapped longitudinal opposite end portions of the contraction spring 20 can be made nearly equal with the spring width of the other portion thereof, the resilient force of the contraction spring 20 to act in the peripheral direction thereof can be equalized. Accordingly, when the clamping means 5 is changed over from the clampable advanced position X to the unclampable retracted position Y, the respective clamping members 25 can be slid smoothly radially inwardly.

Next, the expansion slant cam 21 will be explained with reference to FIG. 1.

A guide cylinder 33 is projected upwardly from the upper end wall 16 of the cylinder body 8. In an annular space between the guide cylinder 33 and the piston rod 14, there is provided the cylindrical expansion slant cam 21 vertically slidably. The expansion slant cam 21 is resiliently urged upwardly by means of a pushing spring 34 and prevented from shifting up not less than a predetermined lift by an inner stopper flange 35 of the guide cylinder 33. A tapered cam surface 36 which is formed at the upper portion of the expansion slant cam 21 is adapted to be brought in contact with a cam engaging surface 37 formed on the lower inner peripheral surfaces of the respective clamping members 25 by a resilient force of the pushing spring 34.

The hydraulic clamp 3 is adapted to be changed over at the time of the clamping and unclamping operations as shown in FIGS. 2(*a*) through 2(*c*).

FIG 2(*a*) shows the unclamping condition, in which the piston 9 is raised to the top dead center by the piston returning spring 13 so that the clamping means 5 is changed over to the unclampable retracted position Y.

When the work 2 is exchanged, the workpiece 2 is first externally fitted to the piston rod 14 from the upper side thereof so as to be set onto the upper surface of the fixed table 1 as shown in FIG. 2(*a*). Then the clamping actuation oil chamber 10 within the cylinder body 8 is supplied with a pressure oil through the oil supply/discharge port 12. Thereupon, the piston 9 is pushed down by the hydraulic pressure against the resilient force of the piston returning spring 13 so that the clamping means 5 can be pushed down by the output portion 28 of the piston rod 14.

Under such a condition that the clamping means expanding actuation is performed during the change-over from the state shown in FIG. 2(*a*) to the state shown in FIG. 2(*b*), the piston 9 and the piston rod 14 are lowered the distance of the clamping means expansion lift N. Accordingly, the clamping means 5 is advanced radially outwardly along the expanding and contracting shift guide ring 27 against the resilient force of the contraction spring 20 so as to be changed over from the unclampable retracted position Y to the clampable advanced position X.

Further, under such a condition that the clamping actuation is performed during the change-over from the state shown in FIG. 2(*b*) to the state shown in FIG. 2(*c*), the piston 9 and the piston rod 14 are adapted to be lowered the distance of the clamping actuation lift M provided below the clamping means expansion lift N. Thereupon, the rod output portion 28 formed in the upper portion of the piston rod 14 pushes down the clamping means 5 and fixedly presses the work 2 through the lower portion 23 of the clamping means 5.

At the time of the change-over from the clamping condition shown in FIG. 2(*c*) to the clamping condition shown in FIG. 2(*a*), the pressure oil is adapted to be discharged from the clamping actuation oil chamber 10 so that the piston 9 can be returned to the top dead center by the resilient force of the piston returning spring 13. In this case, the expanding and contracting shift guide ring 27 is moved together with the ascent of the piston rod 14. And during the transition from the state shown in FIG. 2(*b*) to the state shown in FIG. 2(*a*), the ascent of the expansion slant cam 21 is prevented by the stopper inner flange 35. On the contrary, the respective clamping means 25 is raised continuously through the expanding and contracting shift guide ring 27 so that the clamping means 5 can be changed over from the clampable advanced position X to the unclampable retracted position Y by the resilient force of the contraction spring 20.

As mentioned above, since the clamping means 5 is changed over interlockingly with the piston 9 of the hydraulic cylinder 4, it becomes unnecessary to manually operate the clamping means 5 and the clamping and unclamping operations for the hydraulic clamp 3 become easy.

Figure 15:
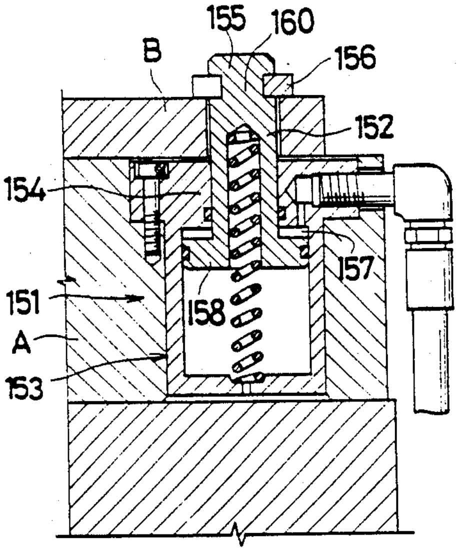
prior art FIG. 15
FIGS. 15 through 17 show conventional embodiments.
Figure 16:
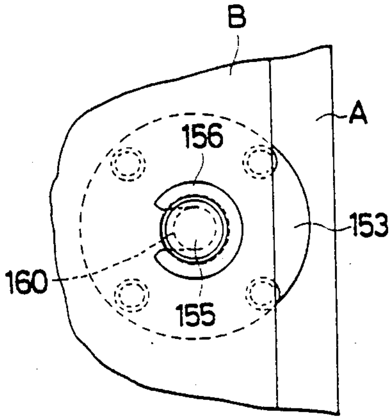
prior art FIG. 16
Figure 17:
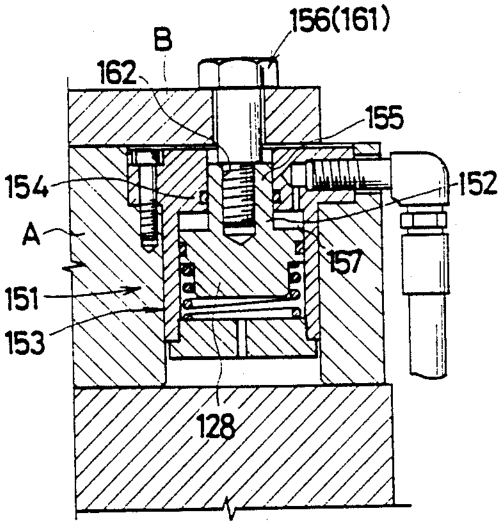
prior art FIG. 17

When automating the operations for advancing and retracting the clamping means 5 radially with respect to the periphery of the piston rod 14, since the position of the clamping means 5 is changed over interlockingly with the operation of the hydraulic cylinder 4, the actuation device for attaching and detaching the clamping means 5 is not required to be structed very differently from the hydraulic clamp having the conventional construction (refer to FIGS. 15 and 16 or to FIG. 17). Furthermore, while the piston 9 is shifted the distances of the respective lifts M, N, since the operational procedure for the positional changing over operation of the clamping means 5 and the clamping and unclamping operations of the hydraulic cylinder 4 is distinguished, the operational procedure control device having the conventional construction is also not required. In this way, since the actuation device for attaching and detaching the clamping means 5 as well as the operational procedure control device can be omitted, the hydraulic clamp 3 can be simplified in construction and made small in size.

Further, since the clamping means 5 is expanded substantially uniformly to the position remote from the periphery of the piston rod 14 at the time of the change-over from the unclampable retracted position Y to the clampable advanced position X, the lower portion 23 of the clamping means 5 is arranged around the whole periphery of the rod output portion 28. Therefore, the openings incapable of pressing can be reduced remarkably and the sufficiently large pressing area can be obtained with certainty. Consequently, the pressing force of the clamping means 5 can be increased and the clamping capability of the hydraulic clamp 3 can be enhanced.

Since the pressing area of the clamping means 5 is sufficiently large, the force per unit area at the contacting surface of the clamping means 5 with the rod output portion 28 can be decreased. Furthermore, since the clamping means 5 is arranged substantially uniformly around the whole periphery of the rod output portion 28, lower stress concentration and the bending stress are generated in the piston rod 14. Accordingly, the durability of the piston rod 14 can be improved.

FIGS. 6 through 9 show a second embodiment of the present invention.

Second Embodiment

The hydraulic clamp 38 is so constructed that the upper portion 19 of the piston rod 14 can be retracted below the upper surface of the fixed table 39 (the fixed member A). The same component members as those employed in the first embodiment are indicated by the same symbols correspondingly.

Figure 6:
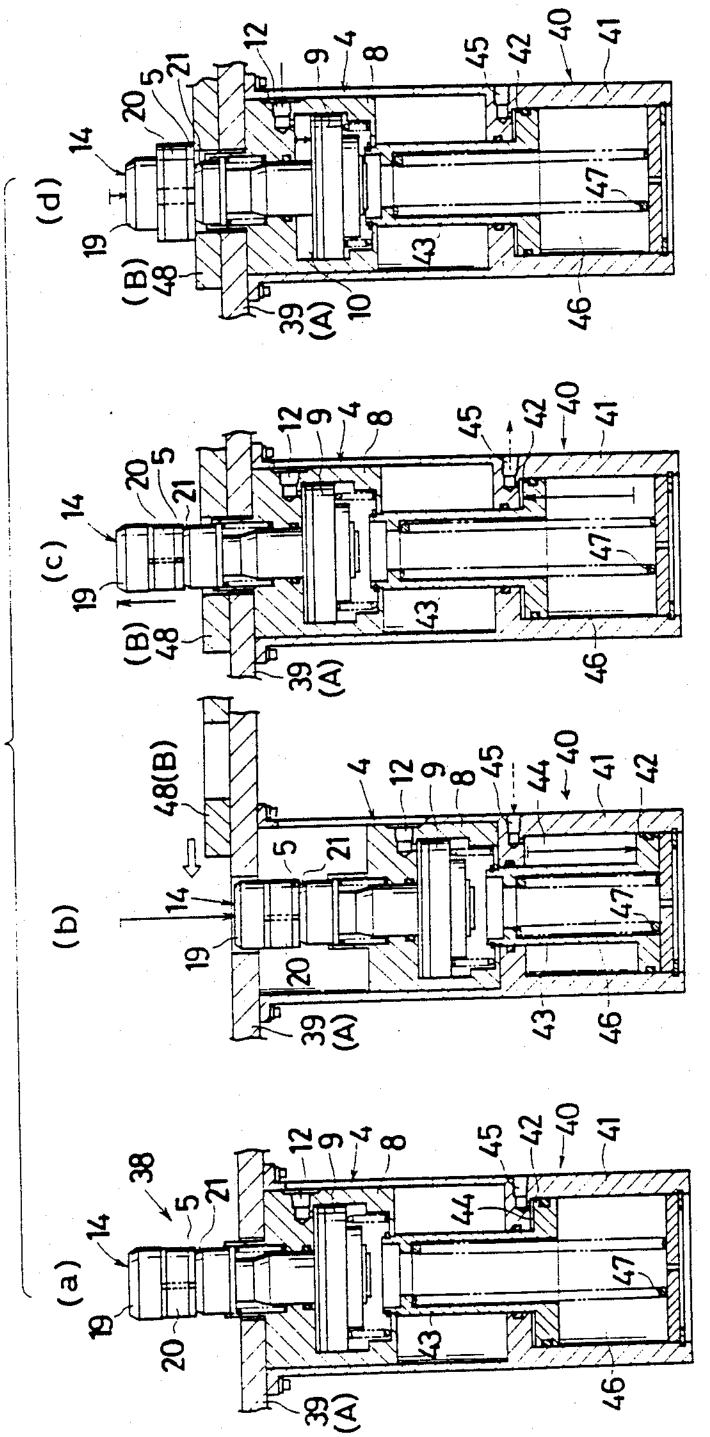

In FIG. 6(*a*) showing the unclamping condition, a pneumatic cylinder body 41 of a pneumatic cylinder 40 is fixedly secured onto the underside of a fixed table 39. The cylinder body 8 of the hydraulic cylinder 4 is accommodated vertically slidably within the upper portion of the pneumatic cylinder body 41 and a pneumatic piston 42 is accommodated within the lower portion of the pneumatic cylinder body 41 vertically slidably in an air-tight manner. The upper end of a pneumatic piston rod 43 projected upwardly from the pneumatic piston 42 is connected to the cylinder body 8 of the hydraulic cylinder 4. A pneumatic actuation chamber 44 provided above the pneumatic piston 42 is in communication with a pneumatic source (not illustrated) through an air supply/discharge port 45. And an ascent spring 47 is mounted within a spring chamber 46 provided below the pneumatic piston 42. The symbol 20 is the contraction spring for the clamping means 5, and the symbol 21 is the expansion slant cam therefor.

The hydraulic clamp 38 having the construction as mentioned above is adapted to operate as follows.

Under the unclamping condition shown in FIG. 6(*a*), the oil supply/discharge port 12 of the hydraulic cylinder 4 and the air supply/discharge port 45 of the pneumatic cylinder 40 are not subjected to a pressure, the cylinder body 8 is raised by the resilient force of the ascent spring 47, and the rod upper portion 19 of the hydraulic cylinder 4 projects outside above the upper surface of the fixed table 39.

Under the above-mentioned condition shown in FIG. 6(*a*), a pressurized air is supplied to the pneumatic actuation chamber 44 through the air supply/discharge port 45. Thereupon, as shown in FIG. 6(*b*), the cylinder body 8 of the hydraulic cylinder 4 is lowered through the pneumatic piston 42 and the pneumatic piston rod 43, and the rod upper portion 19 is retracted below the upper surface of the fixed table 39. Under this condition, a workpiece 48 (a member B to be fixed) is adapted to be sent along the upper surface of the fixed table 39.

Then, under a condition such that the work 48 is placed on the upper surface of the fixed table 39, the pressurized air within the pneumatic actuation chamber 44 is discharged through the air supply/discharge port 45. Thereupon, as shown in FIG. 6(*c*), the cylinder body 8 is raised by the resilient force of the ascent spring 47 so that the rod upper portion 19 projects from the upper surface of the work 48.

Under this condition, shown in FIG. 6(*c*), oil under pressure is adapted to be supplied to the clamping actuation oil chamber 10 within the cylinder body 8 of the hydraulic cylinder 4. Thereupon, as shown in FIG. 6(*d*), the clamping means 5 is pushed down through the piston 9 and the piston rod 14 so that the work 48 is fixedly pressed by the clamping means 5 onto the fixed table 39.

Figure 7:
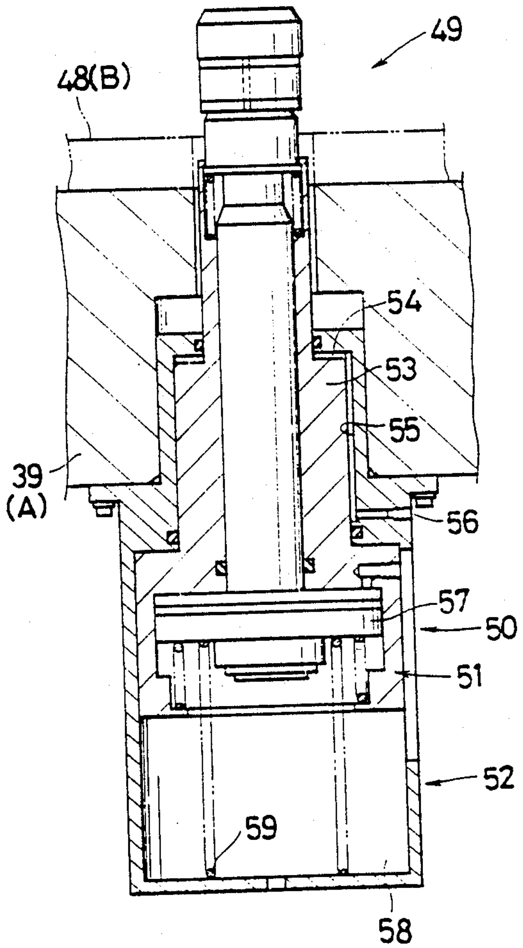

FIG. 7 shows a variant of the embodiment shown in FIG. 6 and is a view corresponding to FIG. 6(*a*).

In this hydraulic clamp 49, a pneumatic piston 53 of a pneumatic cylinder 52 is formed integrally with the upper end portion of a cylinder body 51 of a hydraulic cylinder 50, and a pneumatic actuation chamber 54 is provided above the pneumatic piston 53. The pneumatic actuation chamber 54 is communicated with the air supply/discharge port 56 through a communication groove 55. An ascent spring 59 is mounted between a piston 57 of the hydraulic cylinder 50 and the bottom wall of a spring chamber 58 of the pneumatic cylinder 52.

Third Embodiment

Figure 8:
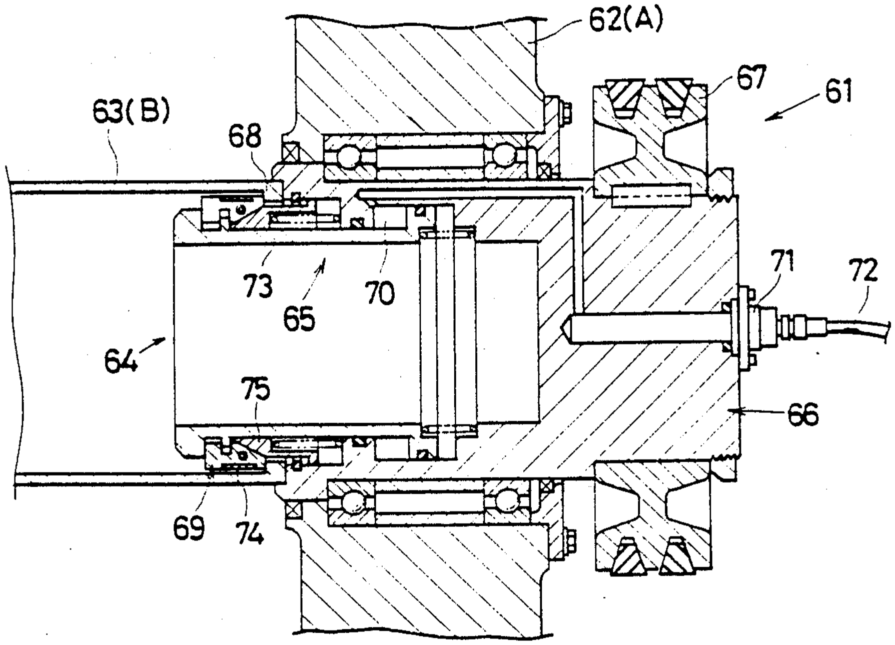

FIG. 8 shows the third embodiment.

In this embodiment, a cylindrical forming roll 63 (a member B to be clamped) is adapted to be detachably attached to a frame 62 (a fixed member A) of a forming machine 61 through a hydraulic clamp 64. The frame 62 is adapted to rotatably support a cylinder body 66 of a hydraulic cylinder 65, and a V belt pulley 67 is fixedly secured to the right end portion of the cylinder body 66. An inner flange 68 formed in the right end portion of the forming roll 63 is adapted to be fixedly pressed onto the left end portion of the cylinder body 66 by a clamping means 69. A pressure oil is adapted to be supplied to a clamping actuation oil chamber 70 within the cylinder body 66 through a rotary joint 71 and a hydraulic hose 72. The symbol 73 indicates a piston rod, the symbol 74 indicates a contraction spring, and the symbol 75 indicates an expansion slant cam.

According to this construction, in case that the external surface of the cylindrical forming roll 63 is damaged by a heavy wear and the like, it is enough to exchange only the forming roll 63 and it is unnecessary to exchange the whole of a roll arrangement differently from a conventional one unit type forming roll. Accordingly, this forming machine 61 is economical because the number of exchanged component members can be decreased at the time of its maintenance.

Fourth Embodiment

Figure 9:
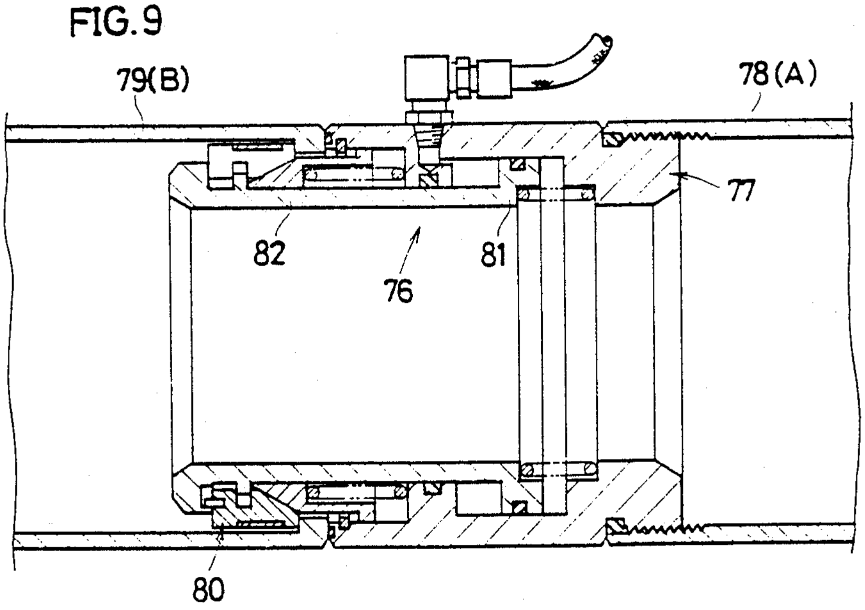

FIG. 9 shows the fourth embodiment

In this embodiment, the right end portion of a cylinder body 77 of a hydraulic cylinder 76 is threadably and fixedly engaged with a fixed pipe 78 (a fixed member A), and a pipe 79 to be connected (a member B to be clamped) is adapted to be fixedly pressed onto the left end portion of the cylinder body 77 by a clamping means 80. A piston 81 and a piston rod 82 of the hydraulic cylinder 76 are formed in a cylindrical configuration so that both of the pipes 78, 79 can be communicated with each other.

FIGS. 10 through 14 illustrate other examples of the present hydraulic clamp.

First Variant Example

Figure 10:
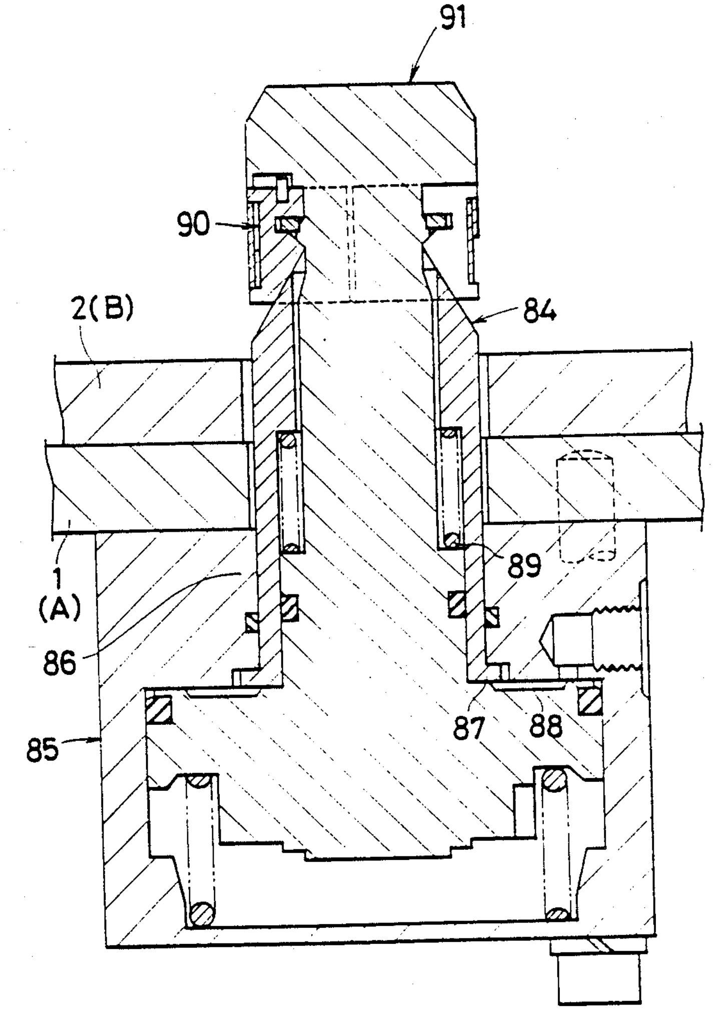

FIG. 10 is a view corresponding to FIG. 1, which shows the first variant example.

In this variant example, the lower portion of an expansion slant cam 84 is accommodated within an upper end wall 86 of a cylinder body 85 vertically slidably in an oil-tight manner. An stopper outer flange 87 is formed in the lower end of the expansion slant cam 84 so that the expansion slant cam 84 can be prevented thereby 87 from being shifted upwardly not less than a predetermined lift by a hydraulic force exerted in a clamping actuation oil chamber 88 as well as a resilient force of a pushing spring 89. By the way, the expansion slant cam 84 may have such a construction as, at least, to be allowed to be lowered with respect to a piston rod 91 at the time of the clamping actuation of a clamping means 90. And the push spring 89 may be omitted so that the cam 84 is pushed up only by a hydraulic pressure as a pushing up force.

Second Variant Example

Figure 11:
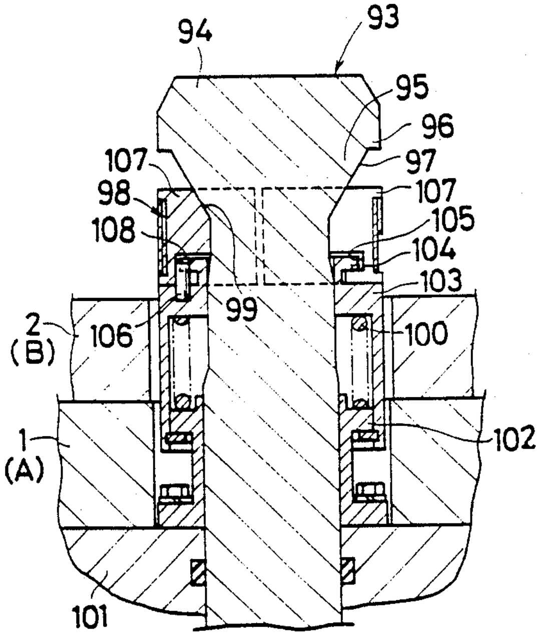

FIG. 11 shows the second variant example and is a partial view corresponding to FIG. 1. An expansion slant cam 95 is formed integrally with the lower portion of a rod upper portion 94 of a piston rod 93, and a rod output portion 96 is arranged above the expansion slant cam 95. A downwardly tapered cam surface 97 of the expansion slant cam 95 is brought in contact with a cam engaging surface 99 of a clamping means 98 by means of a push spring 100. The push spring 100 is mounted between a lower spring retainer 102 fixed to a cylinder body 101 and an upper spring retainer 103 arranged vertically shiftably along a predetermined extent with respect to the lower spring retainer 102. Expanding and contracting shift guide grooves 105 of the clamping means 98 are slidably engaged with an expanding and contracting shift guide ring 104 formed in the upper end of the upper spring retainer 103. A means for guiding the clamping means 98 radially linearly comprises guide pins 106 projected from the upper spring retainer 103 and guide channels 108 formed in respective clamping members 107.

Third Variant Example

Figure 12:
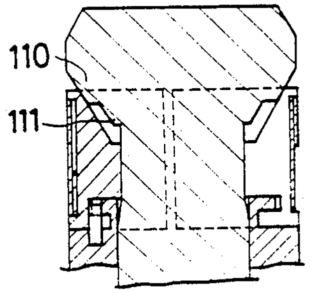

FIG. 12 shows the third variant example. This variant example is obtained by further modifying the one shown in FIG. 11. A rod output portion 111 is formed in the lower portion of an expansion slant cam 110.

Fourth Variant Example

Figure 13:
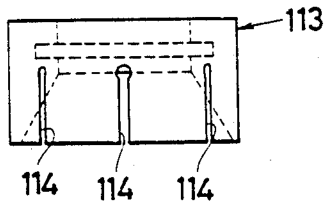

FIG. 13 shows the fourth variant example, in which a clamping means 113 is formed integrally as one piece instead of the above-mentioned separate ones. The lower portion of the clamping means 113 is adapted to be allowed to resiliently deform radially outwardly owing to its large number of slits 114 formed in the lower portion of the clamping means 113, and the clamping means 113 itself functions as a contraction spring by its resilient restoration force.

Fifth Variant Example

Figure 14:
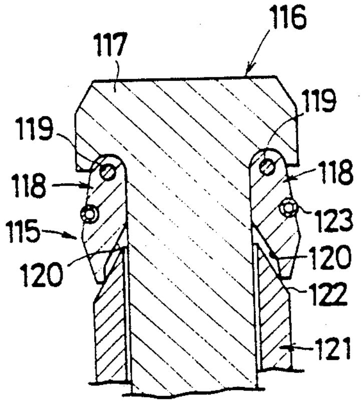

FIG. 14 shows the fifth variant example, in which a clamping means 115 is constructed as follows. A plurality of clamping rods 118 are pivotably connected to the periphery of the lower portion of a rod upper portion 117 of a piston rod 116. That is, the respective clamping rods 118 are supported thereat by respective pivot pins 119. Cam engaging surfaces 120 formed on the inner surfaces of the respective clamping rods 118 is adapted to be brought in contact with a cam surface 122 of an expansion slant cam 121. A contraction spring 123 having an annular shape in plan view is mounted around the outer peripheral surfaces of the respective clamping rods 118. This spring 123 is composed of a coil spring.

Incidentally, the contraction spring in the above-mentioned respective embodiments and variant examples may comprise a coil spring instead of a spiral plate spring.

In this disclosure, there are shown and described only the preferred embodiments of the invention, but, as aforementioned, lit is to be understood that the invention is capable of use in various other combinations and environments and is capable of changes or modifications within the scope of the inventive concept as expressed herein.

I claim:

1. A cylinder type hydraulic clamp including a hydraulic cylinder and a clamping means, comprising:

a hydraulic cylinder body; and a piston having a piston rod projecting upwardly through an upper end wall of said cylinder body and including at an upper portion thereof a clamping means, said clamping means being adapted to be pushed down by a force exerted by the piston and the piston rod under the action of a hydraulic pressure of a pressurized oil supplied to a clamping actuation oil chamber provided within the cylinder body, whereby a workpiece to be clamped when externally fitted to the piston rod is pressed from an upper side thereof between the cylinder body and the clamping means, a lower portion of the clamping means being adapted to be moved between a clamping advanced position radially remote from the periphery of the piston rod and an unclamping retracted position radially close the said periphery of the piston rod, said clamping means being resiliently urged by a spring toward the unclamping retracted position and, conversely, is pushed by coaction with an expansion slant cam toward the clamping advanced position, an allowable stroke for said piston within the cylinder body being not less than a distance obtained by adding a clamping means expansion lift distance to a clamp actuation lift distance, the clamping means operating in a clamping means expanding actuation condition in which the piston and the piston rod are lowered by a distance equal to the clamping means expansion lift distance from the top dead center position thereof, said clamping means being adapted to be pushed expansively by the expansion slant cam against a contraction spring from the unclampable retracted position to the clamping advanced position, and in a a clamp actuation condition in which the piston and the piston rod are lowered the distance of the clamp actuation lift arranged below the clamping means expansion lift, said clamping means being adapted to be pushed down by a rod output portion formed in the; upper portion of the piston rod.

2. A cylinder type hydraulic clamp as recited in claim 1, wherein:

said clamping means comprises a plurality of clamping members arranged in an annular shape;

expanding and contracting shift guide peripheral grooves are formed in the respective clamping members arranged in the annular shape, and an expanding and contracting shift guide ring is engaged with the expanding and contracting shift guide peripheral grooves so as to guide the clamping members radially and slidably, in parallel from the unclamping retracted position to the clamping advanced position in the clamping means expanding actuation condition in which the piston is actuated to move downwardly the distance of the clamping means expansion lift, and conversely so that the expanding and contracting shift guide ring can separate the respective clamping members from the expansion slant cam in the clamping means contraction condition in which the piston is actuated to move upwardly the distance of the clamping means expansion lift.

3. A cylinder type hydraulic clamp as recited in claim 2, wherein:

said contraction spring is composed of a spiral plate spring, which is fitted around a plurality of clamping members arranged in an annular shape.

4. A cylinder type hydraulic type clamp as recited in claim 1, wherein:

said cylinder body of the hydraulic cylinder is fixedly secured to a fixed member.

5. A cylinder type hydraulic clamp as recited in claim 4, wherein:

said member to be clamped is a workpiece.

6. A cylinder type hydraulic clamp as recited in claim 4, wherein:

said cylinder body of the hydraulic clamp is adapted to be actuated upwardly and downwardly by a force supplied by a pneumatic cylinder.

7. A cylinder type hydraulic clamp as recited in claim 4, wherein:

said fixed member and said member to be clamped are both pipes.

8. A cylinder type hydraulic type clamp as recited in claim 1, wherein:

said cylinder body of the hydraulic cylinder is supported rotatably by the fixed member.

* * * * *